April 4, 1961  W. BENEKAM  2,978,003
FLOATING MUSHROOM ROOT TRIMMING MACHINE
Filed July 16, 1957  3 Sheets-Sheet 1
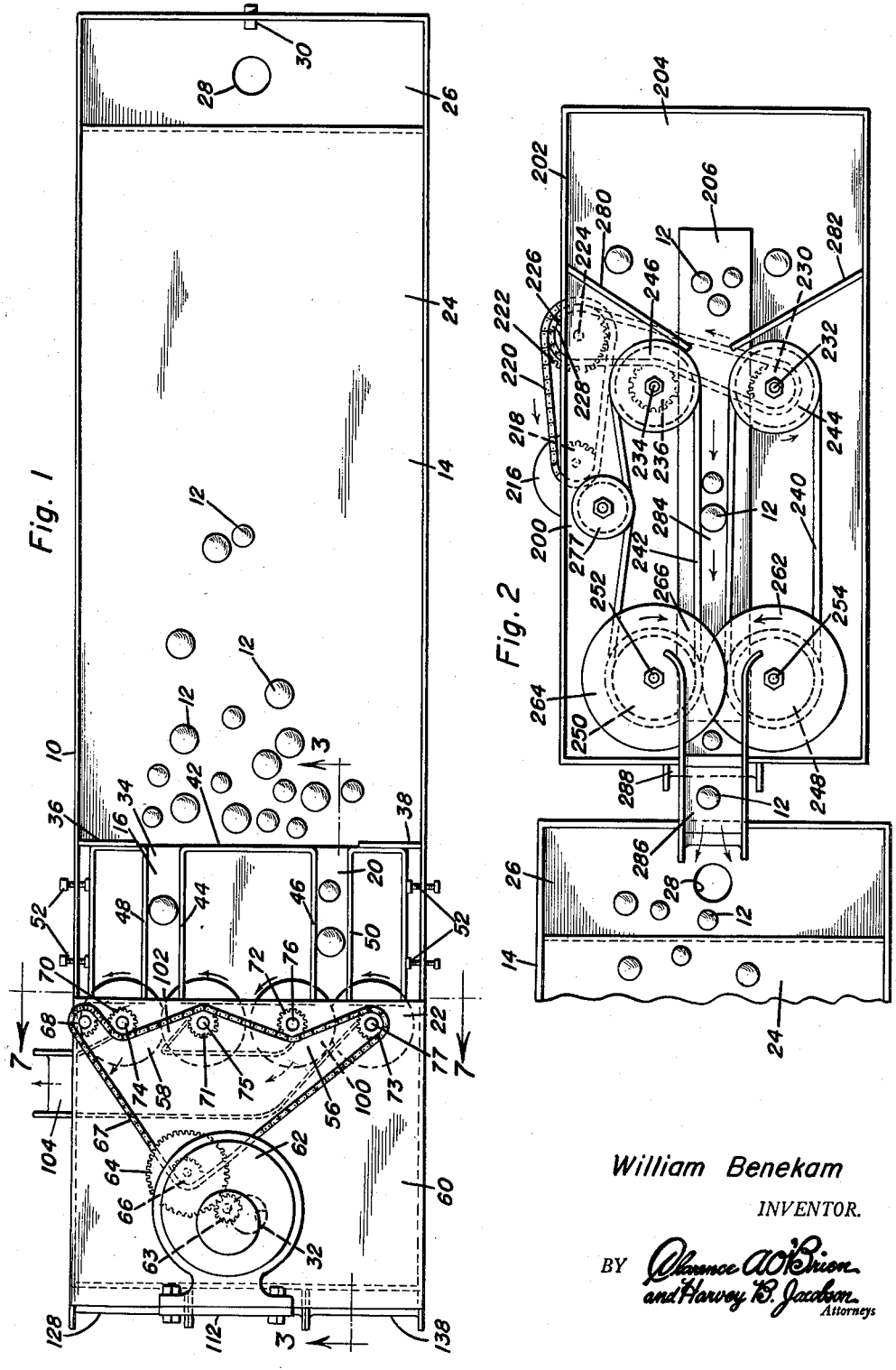
William Benekam
INVENTOR.
BY Clarence A. O'Brien
and Harvey B. Jacobson
Attorneys April 4, 1961 W. BENEKAM 2,978,003
FLOATING MUSHROOM ROOT TRIMMING MACHINE
Filed July 16, 1957 3 Sheets-Sheet 2
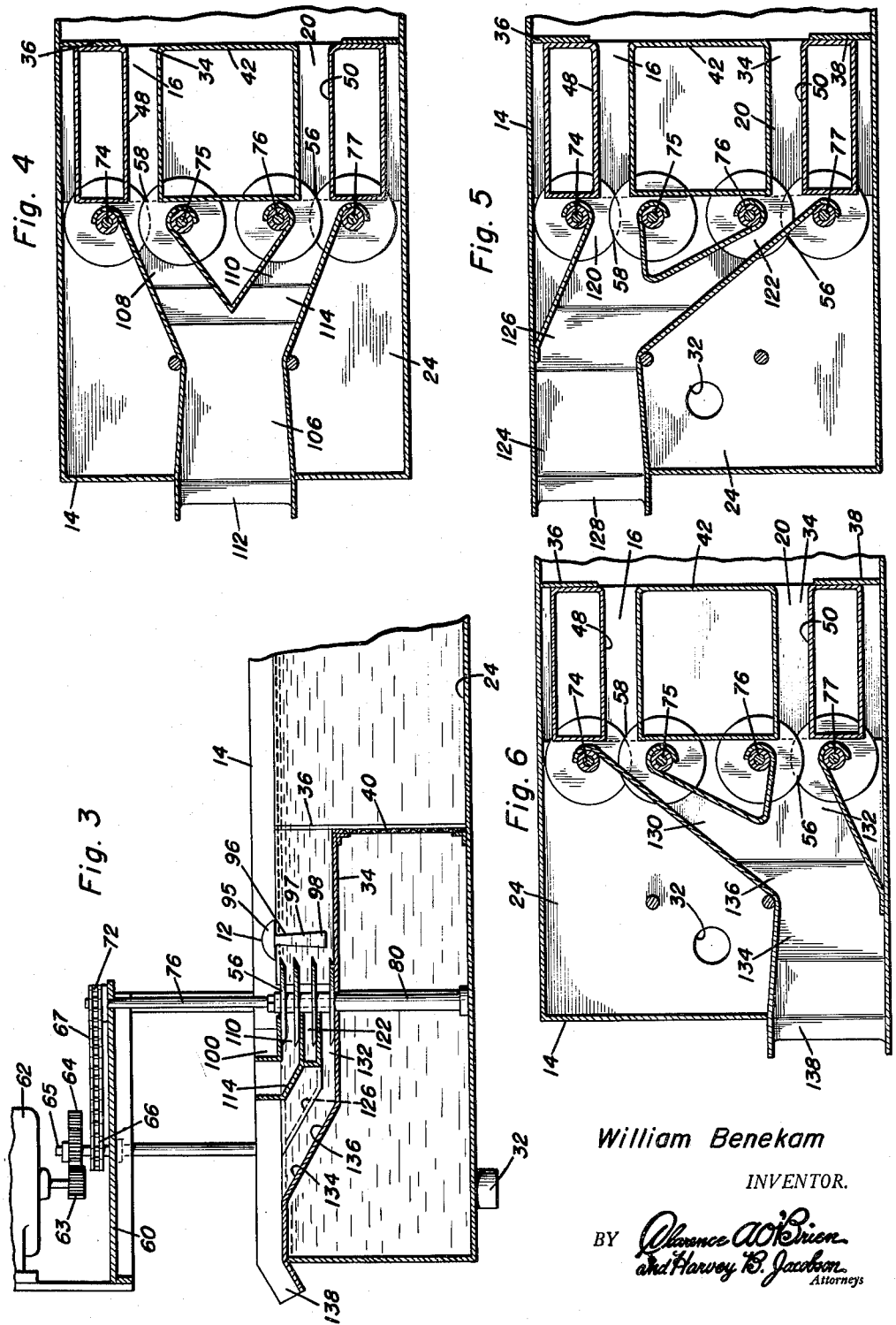
William Benekam
INVENTOR.

April 4, 1961 W. BENEKAM 2,978,003
FLOATING MUSHROOM ROOT TRIMMING MACHINE
Filed July 16, 1957 3 Sheets-Sheet 3
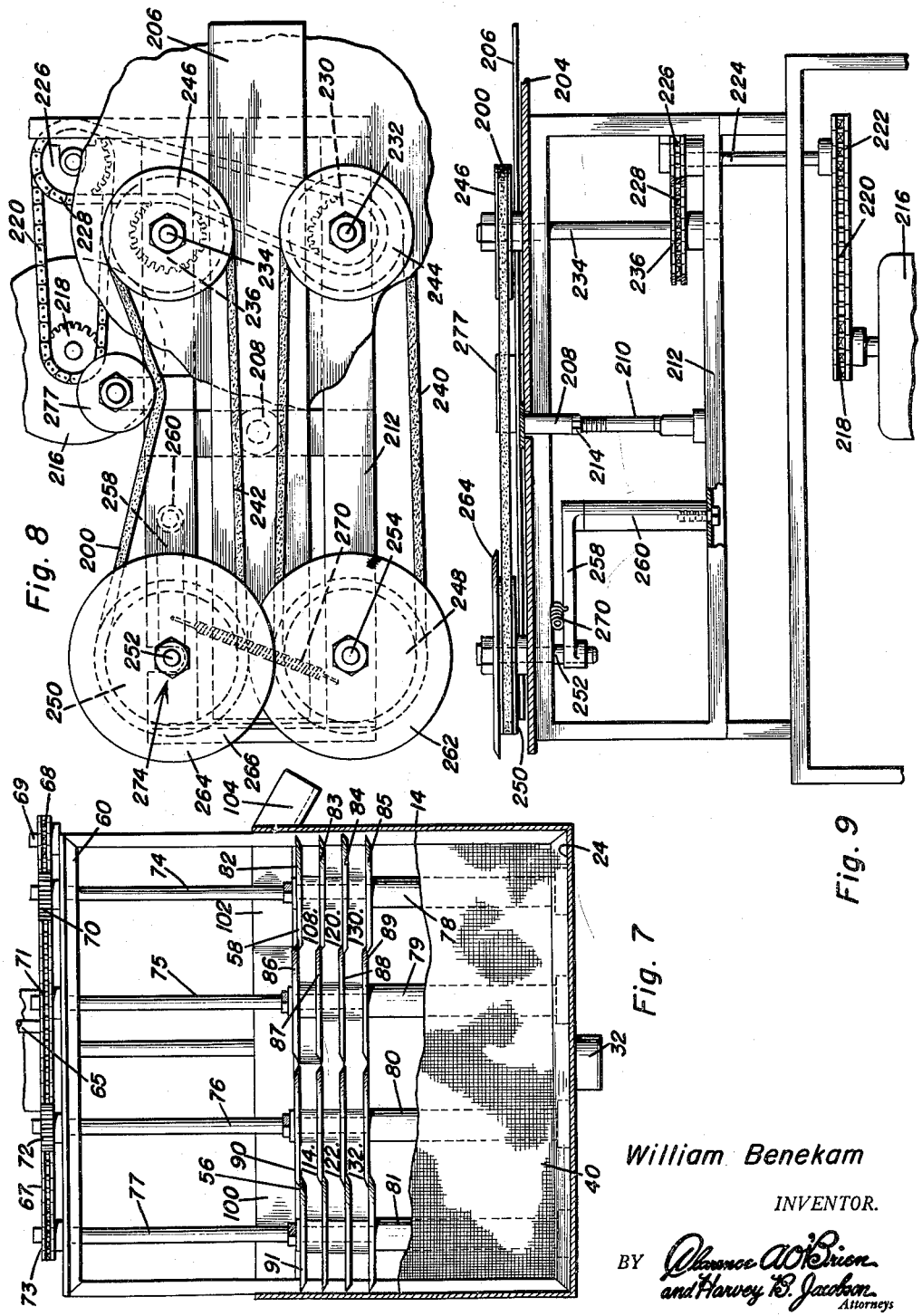
William Benekam
INVENTOR.

2,978,003
FLOATING MUSHROOM ROOT TRIMMING
              MACHINE

William Benekam, 1699 Valley Road, Coatesville, Pa.

Filed July 16, 1957, Ser. No. 672,322

4 Claims. (Cl. 146—81)

This is a continuation-in-part of my copending application Serial No. 603,325, which is now abandoned.

The invention relates to floating vegetable or fruit cutting machines and more particularly to a mushroom trimming machine.

An object of the present invention is to provide a mechanically simplified machine for subdividing mushrooms into several pieces whose value varies, and channeling and subdivided parts of the mushrooms to collection stations. The caps of the mushrooms are the most valuable, and these are held separate from the stem pieces which are subdivided into three pieces, each of which is channeled to its respective collection station.

A more particular object of the invention is to provide a mushroom subdividing machine which relies on the flotation of the mushrooms to support them, the machine having two main feed channels through which the mushrooms are propelled, and the machine having a unique duct system on the downstream side of the channels and are located behind mechanically driven cutters which do the subdividing of the mushrooms.

A further object of the present invention is to provide a mushroom root cutter which prepares the mushrooms prior to entering the channels of the mushroom cutting machine, the root cutter being capable of use independent of the previously described machine or capable of use in combination with it. The root trimming machine has an adjustable table over which the mushrooms are propelled by the flow of water. This water and the trimmed mushrooms may be discharged into the tank of the mushroom subdividing machine so that the complete subdivision of mushrooms is one continuous operation.

A further object of the present invention is to provide equipment for the purpose of subdividing mushrooms into various parts, the equipment utilizing a minimum of complicated mechanical movements. I am aware of prior mushroom cutting machines which have mechanical movements for individually handling or at least positioning the mushrooms so that they may be trimmed and subdivided. However, all of the machines of which I am aware are comparatively complex and are not producible at a low unit cost. Therefore, it is another object of the invention to provide a reasonably inexpensive machine of mechanically simple design but which is capable of subdividing the mushrooms into four or more parts.

Other objects and features of importance will become apparent in following the description of the illustrated form of the invention.

Figure 1 is a top view of a mushroom subdividing or cutting machine constructed in accordance with the invention;

Figure 2 is a top view of a mushroom root trimming machine, this machine being shown as discharging the trimmed mushrooms into the mushroom subdividing machine of Figure 1;

Figure 3 is a fragmentary sectional view taken on the line 3—3 of Figure 1 and showing principally the arrangement of ducts which carry the subdivided parts of the mushrooms from the cutting stations to the collection stations;

Figure 4 is a diagrammatic sectional view with the ducts of Figures 5 and 6 omitted for clarity, this view showing the duct which collects and discharges the top part of the stem that is subdivided, this top part being the nearest to the top of the mushroom;

Figure 5 is a largely diagrammatic sectional view similar to that of Figure 4 but showing the duct which collects and directs the next lower part of the stem of the mushroom;

Figure 6 is a largely diagrammatic sectional view of the duct system on the downstream side of the cutters, this view omitting the ducts that are shown in Figures 4 and 5 and illustrating the duct which collects and directs the lowermost subdivided part of the stem of each mushroom;

Figure 7 is an enlarged cross sectional view taken on the line 7—7 of Figure 1 and showing the cutters;

Figure 8 is an enlarged top view of the mushroom root trimming machine, and;

Figure 9 is a longitudinal sectional view of the mushroom trimming machine of Figure 2 and Figure 8.

In Figure 1 the general organization of the mushroom cutting or subdividing machine 10 is observable. Mushrooms 12 float on water that is in tank 14 and they travel toward two channels 16 and 20. After passing through the channels the mushrooms enter cutting station 22 after which they pass into the duct system. The duct system directs the subdivided parts of the mushrooms 12 to four collection stations for subsequently handling, processing, etc.

Tank 10 has four side walls and a bottom 24. The bottom is dropped at one end of the tank in order to form a sump 26 having drain 28 which only partially drains the tank. Water inlet 30 is in an end wall of the tank and is adapted to connect to a source of water under pressure. Drain 28 may be controlled by a valve and/or an overflow pipe to establish a liquid level in the tank. Drain 32 is in the bottom wall 24 of the tank near the opposite end of the tank and it too may be similarly used with the valve and/or overflow pipe.

Channels 16 and 20 are each constructed similarly. Horizontal wall 34 extends across the tank 14 near its discharge end. Vertical walls 36 and 38 are attached to the sides of the tank extending only a short way across the tank. These are in front of the screen 40 which extends downwardly from the front edge of wall 34 and which attaches to the bottom 24 of tank 14. A stationary baffle 42 which is either square or U-shaped is secured to the top of wall 34. It has sides 44 and 46 which constitute one side of each of channels 16 and 20. The other sides 48 and 50 of each channel are constituted by movable baffles which are also preferably rectangular or U-shaped objects. They rest on the wall 34 and are capable of adjustment transversely of the longitudinal axis of tank 14. Although the adjustment may be achieved in a number of ways, screws 52 whose ends are rotatably secured to the objects and which are threaded in openings in the side walls of the tank 14, are illustrated as typical mechanical means to achieve this end. The result is that the width of channels 16 and 20 are capable of adjustments in order to properly handle the run of mushrooms which are being subdivided by machine 10. Should the bulk of the mushrooms be very large, the channels are open. The channels will be adjusted to a smaller width when the mushroom in the particular group be handled is smaller.

There are two groups of cutters 56 and 58 disposed within the tank 14 and located downstream of the channels 16 and 20. Motor mounting frame 60 is attached to the tank near its discharge end. It supports an electric motor 62 that is controlled by the switch and that operates the cutters 56 and 58. Pinion 63 is secured to the shaft of the motor and it drives gear 64 and is attached to shaft 65. The shaft is mounted in bearings on frame 60 and has a sprocket 66 fixed to it. Chain 67 is entrained around sprocket 66 and around an idler sprocket 68. This idler is mounted for rotation on a spindle 69 that is carried by the frame 60 at one of its sides.

Chain 67 is endless and entrained around alternate sides of four sprockets 70, 71, 72 and 73 which are fixed to shafts 74, 75, 76 and 77 respectively. The lower ends of the shafts are mounted for rotation in bearings 78, 79, 80 and 81 that are carried in tank 14 (Figure 7), and the upper ends of the shafts are mounted for rotation in bearings on frame 60. There are four spaced knives 82, 83, 84 and 85 fixed to shaft 74 and four spaced knives 86, 87, 88 and 89 fixed to shaft 75. The knives of shaft 74 and the knives of shaft 75 slightly overlap at the centerline of channel 16 and constitute cutter 58. Similarly spaced and mounted knives 90 on shaft 76 coact with a group of knives 91 on shaft 77 to constitute cutter 56. The cutters 56 and 58 have their knives rotating in a direction to help guide and propel the mushrooms through the cutting station 22 after leaving the two channels 16 and 20. The mushrooms are intended to be fed manually or at least aided by manual direction when carried by the water flow from the water inlet 30.

An important feature of the invention is the structural organization by which the subdivided parts of mushrooms 12 are handled. As shown in Figure 3 a typical mushroom 12 is to be subdivided into a cap 95, an upper part 96 of the stem, an intermediate part 97 of the stem and a lower part 98 of the stem of the mushroom. The uppermost knives of cutters 56 and 58 cut the cap 95 from mushroom 12. The cap then enters duct 100 or duct 102 depending on which channel 16 or 20 the mushroom 12 has traversed. The ducts 100 and 102 lead into and open into a collection duct 104 that extends transversely across a part of tank 14. The ducts 100 and 102 form branch duct 104 which opens laterally of the machine (Figure 4) and into an awaiting container or other collection device. Ducts 100, 102 and 104 are formed by a channel-shaped, upwardly opening structure.

The uppermost part 96 of the mushroom stem is received, guided and discharged by duct 106 (Figure 4). This duct has inlet branches 108 and 110 whose ends open in registry with channels 16 and 20 and whose opposite ends form a continuation of the main discharge part of the duct 106. Chute 112 at the end of the duct discharges the uppermost parts 96 of the stem of the mushrooms which are severed by the top pair and the second pair of knives of the two cutters 56 and 58. Inspection of Figures 3 and 4 show that duct 106 is located in part below the duct 104 and therefore, it has a part of its bottom wall 114 and its top wall angulated. All of the ducts are nested neatly together in this way. In addition the front ends of the feeder parts of each duct are hooked around spacers on the four shafts 74, 75, 76 and 77 respectively.

The intermediate part 97 of each mushroom stem is severed by the action of the second and third knives of the two cutters 56 and 58. Thereafter the water flow propels this part of each of the mushroom stems into the inlet parts 120 and 122 of duct 124. Duct 124 nests beneath duct 106 and has angular parts 126 formed in its upper and lower walls fit neatly with the above duct. Discharge chute 128 is at the end of duct 124 in order to direct the parts of the mushroom into an awaiting container.

The lowermost parts 98 of each mushroom stem are severed by the bottom two knives of the cutters 56 and 58. After severing the parts 98 of each mushroom are propelled into the inlet parts 130 and 132 of duct 134. This duct fits below the duct 106 and therefore it has angulated parts 136 in its upper and lower walls to enable it to nest neatly therebelow. Chute 138 at the end of duct 134 directs the mushrooms into an awaiting container.

There is a mushroom root severing machine 200 illustrated in Figures 2, 8 and 9. This machine is useful in combination with machine 10 in order to form a continuous operation on the mushrooms. The machine 10 is independently useful, though, and the same applies to machine 200. Machine 200 is in a shallow tank 202 that has side walls and a bottom 204. A mushroom table 206 is disposed in the tank 202 and is adjustable with respect to the elevation of bottom 204. The adjustment is achieved by attaching the table 206 to a sleeve 208 and supporting the sleeve on a threaded shank 210 carried by framework 212. Nut 214 on threaded shank 210 holds the sleeve 208 and therefore table 206 in selected elevation. Motor 216 is carried by framework 212 and has a sprocket 218 attached to its shaft. Chain 220 is entrained around the sprocket 218 and is entrained around a sprocket 222 on shaft 224. The shaft 224 is guided in bearings supported by framework 212 and has a sprocket 226 fixed to it. Chain 228 is engaged with sprocket 226 and entrained around sprocket 230 on shaft 232. The shaft is mounted for rotation in framework 212 as is shaft 234 which has sprocket 236 fixed to it. Chain 228 is entrained around one side of sprocket 230 and around another side of sprocket 236 so that the shafts 232 and 234 rotate in opposite directions in response to actuation of motor 216. Endless belts 240 and 242 are entrained around pulleys 244 and 246 that are secured to shafts 232 and 234, respectively. These belts are also entrained around pulleys 248 and 250 that are mounted on sprindles 252 and 254. Spindle 254 is attached to framework 212 while spindle 252 is carried by a swinging arm 258 (Figure 9) whose end is oscillatable on support 260 that is carried by framework 212. Knives 262 and 264 that are attached to pulleys 248 and 250, coact to form a cutter 266, spring 270 has one end secured to arm 258 and the other end secured to a part of framework 212. The bias of the spring is in a direction to keep the arm 258 yieldingly in a position with spindle or shaft 252 in notch 274 in a part of framework 212. Since knife 264 and its supporting arm 258 are capable of swinging, idler 77 for belt 242 is carried by framework 212.

The mushrooms are fed into the receiving end of tank 204 and guided between the baffles 280 and 282 that are carried by the tank and located above table 206. The mushrooms are propelled along the table by the moving sides of channel 284 which is formed by the adjacent flights of the endless belts 240 and 242 and by table 206. The channel 284 feeds the cutter 266 which severs the root of each of the mushrooms. Duct 286 is attached to the discharge end of the tank 202 and at the flotation level of the mushrooms. The cropped mushrooms are then discharged into the tank 24 or into a container. The roots of the mushrooms being at a lower elevation than the remainder of the mushrooms when cut, pass through the discharge chute 288 together with a quantity of water which is either recirculated or discharged.

Other uses, modifications and changes which fall within the scope of the claims may be resorted to.

What is claimed as new is as follows:

1. A machine for trimming the roots from mushrooms, said machine comprising a water tank, a table in said tank, means for adjusting the elevation of said table in said tank, two pairs of pulleys, means mounting said pulleys for rotation in said tank and at approximately the level of said table, endless conveyors entrained around said pairs of pulleys, said endless conveyors having confronting spaced flights constituting the side walls of a channel, the bottom of said channel constituted by a part of the upper surface of said table, said channel adapted to convey mushrooms that are floating in water within said tank, a cutter in registry with said channel to sever the root of the mushrooms as they are propelled into said cutter, said tank having a discharge end, and means at said discharge end of the tank and at the flotation level of the cropped mushrooms for guiding the cropped mushrooms from said tank.

2. The machine of claim 1 wherein said guiding means has sides overlying said cutter, and baffles at the entrance of said channel to guide the mushrooms into said channel.

3. A machine for trimming the roots from mushrooms, said machine comprising a water tank, a table in said tank, pairs of pulleys, means mounting said pulleys for rotation in said tank and at approximately the level of said table, endless conveyors entrained around said pairs of pulleys, said endless conveyors having confronting spaced flights constituting the side walls of a channel, the bottom of said channel constituted by a part of the upper surface of said table, said channel adapted to convey mushrooms that are floating within water within said tank, a cutter in registry with said channel to sever the root of the mushrooms as they are propelled into said cutter, means downstream of said cutter for guiding the cropped mushrooms from said tank, and means at a level below said cutter for conducting the root ends of the mushrooms from the tank and separately from the cropped mushrooms.

4. In a machine for trimming vegetables wherein the machine has a flotation tank, a table in said tank, a channel having walls between which the vegetables are adapted to be propelled, at least one cutter in said channel to sever the vegetables as they are propelled through said channel, said cutter dissecting said channel to sever the vegetables into at least two parts spaced from each other by said cutter, and means for separately conducting the parts of the severed vegetables in separate paths of travel from the tank, said sides of said channel comprising flights of a pair of endless conveyors, means mounting said conveyors in said tank, said channel having a bottom constructed of said table, and means adjustably mounting said table in the tank for movement toward and away from said flights of said endless conveyor thereby selectively elevating and lowering the level at which the vegetables are propelled in said channel.

References Cited in the file of this patent

UNITED STATES PATENTS

| | | |
|---|---|---|
| 2,178,920 | Savery | Nov. 7, 1939 |
| 2,262,882 | Bucklin | Nov. 18, 1941 |
| 2,435,762 | Urschel | Feb. 10, 1948 |
| 2,611,405 | Bailey | Sept. 23, 1952 |
| 2,793,665 | Pinard | May 28, 1957 |
| 2,837,131 | Fried | June 3, 1958 |